(12) United States Patent
Hanamoto et al.

(10) Patent No.: US 9,495,374 B2
(45) Date of Patent: Nov. 15, 2016

(54) RECORDING MEDIUM, INFORMATION MANAGEMENT METHOD, AND INFORMATION MANAGEMENT DEVICE ASSOCIATING OBJECTS WITH EACH OTHER BASED UPON WHETHER FOLDERS MATCH

(71) Applicants: FUJITSU LIMITED, Kawasaki-shi, Kanagawa (JP); HONDA MOTOR CO., LTD., Minato-ku, Tokyo (JP)

(72) Inventors: Kazuhisa Hanamoto, Kawasaki (JP); Yasuo Kurosaki, Wako (JP)

(73) Assignees: FUJITSU LIMITED, Kawasaki (JP); HONDA MOTOR CO., LTD., Tokyo (JP)

( * ) Notice: Subject to any disclaimer, the term of this patent is extended or adjusted under 35 U.S.C. 154(b) by 176 days.

(21) Appl. No.: 14/140,190

(22) Filed: Dec. 24, 2013

(65) Prior Publication Data
US 2014/0188951 A1 Jul. 3, 2014

(30) Foreign Application Priority Data
Dec. 28, 2012 (JP) .................................. 2012-289102

(51) Int. Cl.
*G06F 17/30* (2006.01)
(52) U.S. Cl.
CPC .............................. *G06F 17/30091* (2013.01)
(58) Field of Classification Search
CPC .............................................. G06F 17/30091
See application file for complete search history.

(56) References Cited

U.S. PATENT DOCUMENTS

| | | | |
|---|---|---|---|
| 2002/0107859 A1 | 8/2002 | Tsuyuki | |
| 2011/0202506 A1* | 8/2011 | Newson | G06F 17/30067 707/661 |
| 2012/0278694 A1* | 11/2012 | Washio | G06F 17/2288 715/205 |

FOREIGN PATENT DOCUMENTS

| | | |
|---|---|---|
| CN | 1381800 | 11/2002 |
| JP | 6-195255 | 7/1994 |
| JP | 2002-312404 | 10/2002 |
| JP | 2012-198635 | 10/2012 |
| JP | 2012-226546 | 11/2012 |

OTHER PUBLICATIONS

Japanese Office Action dated May 24, 2016 in corresponding Japanese Patent Application No. 2012-289102.
Office Action, dated Aug. 5, 2016, in Chinese Application No. 201310739193.8 (14 pp.).
Japanese Office Action dated Aug. 16, 2016 in corresponding Japanese Patent Application No. 2012-289102.

* cited by examiner

*Primary Examiner* — Grace Park
(74) *Attorney, Agent, or Firm* — Staas & Halsey LLP

(57) ABSTRACT

The file management server refers, when file information on at least two files targeted for association is acquired, to a storing unit that stores therein condition information, in which conditions for determining whether association between files is permitted are set, and determines whether the two files in the file information satisfy a condition that is set in the condition information and associates, when the condition is satisfied, the two files.

4 Claims, 13 Drawing Sheets

FIG.4

| OBJECT ID | TYPE | FOLDER | FILE | FILE ELEMENT |
|---|---|---|---|---|
| object0001 | FOLDER | FUNCTIONAL REQUIREMENT | - | - |
| object0002 | FILE | FUNCTIONAL REQUIREMENT | FUNCTIONAL REQUIREMENT DOCUMENT | - |
| object0003 | ELEMENT | FUNCTIONAL REQUIREMENT | FUNCTIONAL REQUIREMENT DOCUMENT | FUNCTIONAL REQUIREMENT 1 |
| object0004 | ELEMENT | FUNCTIONAL REQUIREMENT | FUNCTIONAL REQUIREMENT DOCUMENT | FUNCTIONAL REQUIREMENT 2 |
| object0005 | FOLDER | FUNCTIONAL DESIGN | - | - |
| object0006 | FILE | FUNCTIONAL DESIGN | FUNCTION A DESIGN DOCUMENT | - |
| object0007 | ELEMENT | FUNCTIONAL DESIGN | FUNCTION A DESIGN DOCUMENT | FUNCTION A1 DESIGN |
| object0008 | ELEMENT | FUNCTIONAL DESIGN | FUNCTION A DESIGN DOCUMENT | FUNCTION A2 DESIGN |
| object0009 | FILE | FUNCTIONAL DESIGN | FUNCTION B DESIGN DOCUMENT | - |
| object0010 | ELEMENT | FUNCTIONAL DESIGN | FUNCTION B DESIGN DOCUMENT | FUNCTION B1 DESIGN |
| object0011 | FOLDER | DETAILED FUNCTIONAL DESIGN | - | - |
| object0012 | FILE | DETAILED FUNCTIONAL DESIGN | FUNCTION A1 DETAILED DESIGN DOCUMENT | - |
| object0013 | ELEMENT | DETAILED FUNCTIONAL DESIGN | FUNCTION A1 DETAILED DESIGN DOCUMENT | DETAILED DESIGN (a) |
| object0014 | ELEMENT | DETAILED FUNCTIONAL DESIGN | FUNCTION A1 DETAILED DESIGN DOCUMENT | DETAILED DESIGN (b) |
| object0015 | FILE | DETAILED FUNCTIONAL DESIGN | FUNCTION A2 DETAILED DESIGN DOCUMENT | - |
| object0016 | ELEMENT | DETAILED FUNCTIONAL DESIGN | FUNCTION A2 DETAILED DESIGN DOCUMENT | DETAILED DESIGN (α) |
| object0017 | FILE | DETAILED FUNCTIONAL DESIGN | FUNCTION B1 DETAILED DESIGN DOCUMENT | - |
| object0018 | ELEMENT | DETAILED FUNCTIONAL DESIGN | FUNCTION B1 DETAILED DESIGN DOCUMENT | DETAILED DESIGN (i) |
| object0019 | FOLDER | REQUIREMENT TEST SPECIFICATION | - | - |
| object0020 | FILE | REQUIREMENT TEST SPECIFICATION | REQUIREMENT 1 TEST SPECIFICATION | - |
| object0021 | ELEMENT | REQUIREMENT TEST SPECIFICATION | REQUIREMENT 1 TEST SPECIFICATION | TEST SPECIFICATION 1 |
| object0022 | FOLDER | FUNCTION TEST SPECIFICATION | - | - |
| object0023 | FILE | FUNCTION TEST SPECIFICATION | FUNCTION A1 TEST SPECIFICATION DOCUMENT | - |
| object0024 | ELEMENT | FUNCTION TEST SPECIFICATION | FUNCTION A1 TEST SPECIFICATION DOCUMENT | TEST SPECIFICATION A1 |
| ⋮ | ⋮ | ⋮ | ⋮ | ⋮ |

FIG.5

| CONDITION NUMBER | TYPE | CONDITION 1 | CONDITION 2 |
|---|---|---|---|
| P001 | folder | FUNCTIONAL REQUIREMENT | FUNCTIONAL DESIGN |
| P002 | folder | FUNCTIONAL DESIGN | DETAILED FUNCTIONAL DESIGN |
| P003 | folder | FUNCTIONAL DESIGN | FUNCTION TEST SPECIFICATION |
| P004 | folder | FUNCTIONAL REQUIREMENT | REQUIREMENT TEST SPECIFICATION |
| P005 | file | FUNCTION A DESIGN DOCUMENT | FUNCTION A1 DETAILED DESIGN DOCUMENT |
| P006 | file | FUNCTION A DESIGN DOCUMENT | FUNCTION A2 DETAILED DESIGN DOCUMENT |
| P007 | file | FUNCTION B DESIGN DOCUMENT | FUNCTION B1 DETAILED DESIGN DOCUMENT |
| P008 | element | FUNCTION A1 DESIGN | FUNCTION A1 DETAILED DESIGN DOCUMENT |
| P009 | element | FUNCTION A1 DESIGN | DETAILED DESIGN (a) |
| P010 | element | FUNCTION A1 DESIGN | DETAILED DESIGN (b) |
| P011 | element | FUNCTION B1 DESIGN | DETAILED DESIGN ($\alpha$) |
| P012 | element | FUNCTIONAL REQUIREMENT 1 | TEST SPECIFICATION 1 |
| P013 | element | FUNCTION A1 DESIGN | TEST SPECIFICATION A1 |
| ⋮ | ⋮ | ⋮ | ⋮ |

FIG.7

| OBJECT ID$_1$ | OBJECT ID$_2$ |
|---|---|
| object0002 | object0006 |
| object0002 | object0009 |
| object0002 | object0020 |
| object0003 | object0006 |
| object0003 | object0021 |
| object0004 | object0009 |
| object0006 | object0012 |
| object0006 | object0015 |
| object0006 | object0023 |
| object0007 | object0012 |
| object0007 | object0013 |
| object0007 | object0014 |
| object0007 | object0024 |
| object0008 | object0015 |
| object0008 | object0016 |
| object0010 | object0017 |
| object0010 | object0018 |
| object0010 | object0018 |
| ⋮ | ⋮ |

FIG.9

SEARCH SCREEN

·SPECIFY FILE ELEMENT TARGETED FOR SEARCH·

| FOLDER | FUNCTIONAL DESIGN ▼ | FILE | FUNCTION A DESIGN DOCUMENT ▼ | FILE ELEMENT | FUNCTION A1 DESIGN ▼ |

- FUNCTIONAL REQUIREMENT
- FUNCTIONAL DESIGN
- DETAILED FUNCTIONAL DESIGN
- NULL

- FUNCTION A DESIGN DOCUMENT
- DETAILED FUNCTIONAL DESIGN
- NULL

- FUNCTION A1 DESIGN
- FUNCTION A2 DESIGN
- NULL

·SPECIFY SEARCH COUNT·

SEARCH COUNT: 1 ▼
- 0
- 1
- 2
- ALL HIERARCHIES

·SPECIFY GRANULARITY OF SEARCH RESULT·

GRANU-LARITY: FILE ▼
- FOLDER
- FILE
- FILE ELEMENT
- NULL

[SEARCH] (200A)  [CANCEL] (200B)

RECORDING MEDIUM, INFORMATION MANAGEMENT METHOD, AND INFORMATION MANAGEMENT DEVICE ASSOCIATING OBJECTS WITH EACH OTHER BASED UPON WHETHER FOLDERS MATCH

CROSS-REFERENCE TO RELATED APPLICATION

This application is based upon and claims the benefit of priority of the prior Japanese Patent Application No. 2012-289102, filed on Dec. 28, 2012, the entire contents of which are incorporated herein by reference.

FIELD

The embodiments discussed herein are related to an information management program, an information management method, and an information management device.

BACKGROUND

When products are designed and developed, files related to outcomes, such as specification documents, design documents, verification data, or the like, that are created at each of the designing and development steps, i.e., processing steps, are managed. These files are managed by, for example, a control system or an embedded system that is used in the automobile industry, the electronic manufacturing industry, the precision machinery industry, or the like in the course of products being manufactured. In this way, when the files are managed, files related to each other are associated in order to specify the affected region if a part of the specification or design needs to be changed. This associating process is used in order to improve traceability.

Patent Document 1: Japanese Laid-open Patent Publication No. 06-195255

However, with the file management described above, there is a problem in that files that have weak relationship are erroneously associated with each other. In this way, when files are erroneously associated, the affected region due to the change is not appropriately specified, and thus traceability is reduced.

SUMMARY

According to an aspect of an embodiment, a computer-readable recording medium having stored therein an information management program causing a computer to execute a process. The process includes referring, when file information on at least two files targeted for association is acquired, to a storing unit that stores therein condition information, in which conditions for determining whether association between files is permitted are set, and determining whether the two files in the file information satisfy a condition that is set in the condition information, and associating, when the condition is satisfied, the two files.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a schematic diagram illustrating an example of object information;

FIG. 5 is a table illustrating an example of condition information;

FIG. 7 is a schematic diagram illustrating an example of association information;

FIG. 9 is a schematic diagram illustrating an example of a screen displayed on a client terminal;

DESCRIPTION OF EMBODIMENTS

Preferred embodiments will be explained with reference to accompanying drawings. The present invention is not limited to these embodiments. Furthermore, the embodiments can be used in any appropriate combination as long as the processes do not conflict with each other.

[a] First Embodiment
System Configuration

Figure 1:
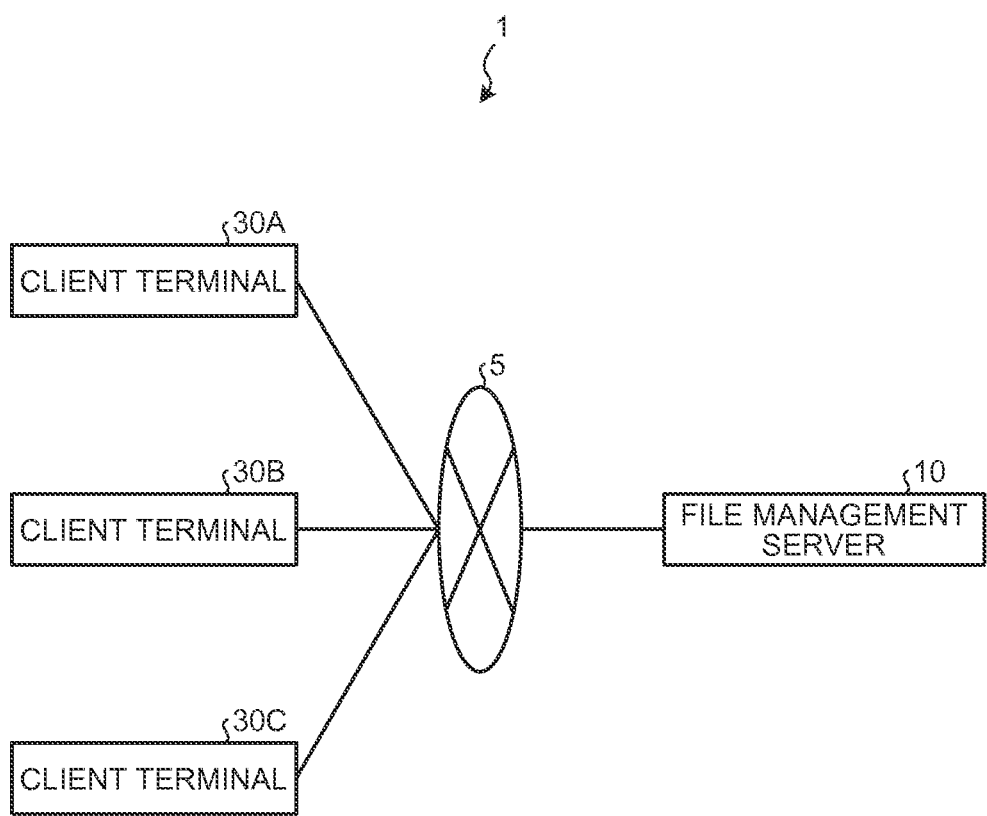
FIG. 1 is a schematic diagram illustrating the configuration of a file management system according to a first embodiment.

FIG. 1 is a schematic diagram illustrating the configuration of a file management system 1 according to a first embodiment. The file management system 1 illustrated in FIG. 1 manages files related to outcomes, i.e., development assets, such as specification documents, design documents, verification data, or the like, that are created by client terminals 30A to 30C at each step of designing and developing products.

As illustrated in FIG. 1, the file management system 1 accommodates therein a file management server 10 and the client terminals 30A to 30C. FIG. 1 illustrates three client terminals; however, the file management system 1 may also accommodate therein an arbitrary number of client terminals. Furthermore, FIG. 1 illustrates an example case in which a single file management server manages files; however, multiple file management servers may also separately manage the files. In the description below, if there is no need to distinguish among the client terminals 30A to 30C, the client terminals 30A to 30C may sometimes be collectively referred to as a "client terminal 30".

The file management server 10 is connected to the client terminal 30 via a network 5 such that they can communicate with each other. Any kind of communication network, such as the Internet, a LAN (Local Area Network) and a VPN (Virtual Private Network), may be used as the network 7 irrespective of whether the network is wired or wireless.

The file management server 10 is a computer that provides the client terminal 30 with an information management service that manages files that are related to development assets obtained as outcomes at each step of designing and developing a product. The file management server 10 may also function as a Web server that executes a process related to the information management service or may also function by using cloud computing that provides an outsourced information management service. Furthermore, for example, by preinstalling or installing, in a desired computer, an information management program that is provided as packaged software or online software, the computer functions as the file management server 10.

The client terminal 30 is a computer that receives the information management service that is provided. For example, the client terminal 30 is used by developers involved in developing and designing products, persons indirectly involved in developing and designing products, or the like. In the following, developers and persons involved may sometimes be collectively referred to as a "person involved in development". For example, in addition to a fixed terminal, such as a personal computer, or a mobile terminal, such as a smart phone, a mobile phone, a cellular phone, a personal handyphone system (PHS), a personal digital assistant (PDA), or the like, may also be used as the client terminal 30.

An application program, such as a Web browser, that functions as the front end that receives an information management service provided by the file management server 10 is preinstalled or installed in the client terminal 30. In the description below, an application program running on the client terminal 30 may sometimes be referred to as a "client application".

For example, the client terminal 30 receives, via a client application, an input of authentication information related to a login, such as an account name or a password of a person involved in development, and then sends, to the file management server 10, the authentication information related to the login. Consequently, the person involved in development receives a login authentication. Consequently, when the login authentication is successful, i.e., authentication is obtained that an operator of the client terminal 30 is the person involved in development, a part or all of the information management service is released, by the file management server 10, in accordance with the authorization held by the person involved in development. After the login authentication has succeeded, the client terminal 30 can receive operations of various files used by the person involved in development with respect to the file management server 10 via the client application.

Examples of these file operations include an operation of uploading a new file to the file management server 10, an operation of changing a part of a file managed in the file management server 10, or an operation of deleting a file. In the following, document files, such as specification documents, design documents, verification data, or the like, that are created by word processing software or spreadsheet software at each step of designing and developing products may sometimes be referred to as a "document". Another example of these file operations includes an association operation in which, from among files managed by the file management server 10, multiple pieces of information that are related with each other are associated. This associating operation is performed with the aim of implementing traceability of searching for, for example, the affected region in which a change in a file has an effect on another file.

The "file information" mentioned here does not always mean a file itself. It may also be an element included in a document represented by the content of the file. For example, in a spreadsheet file, "file information" is a cell, i.e., a box, displayed by the spreadsheet software. In the following, an element included in a document represented by the content of a file, such as a cell in a spreadsheet software, may sometimes be referred to as a "file element".

Configuration of the File Management Server 10

Figure 2:
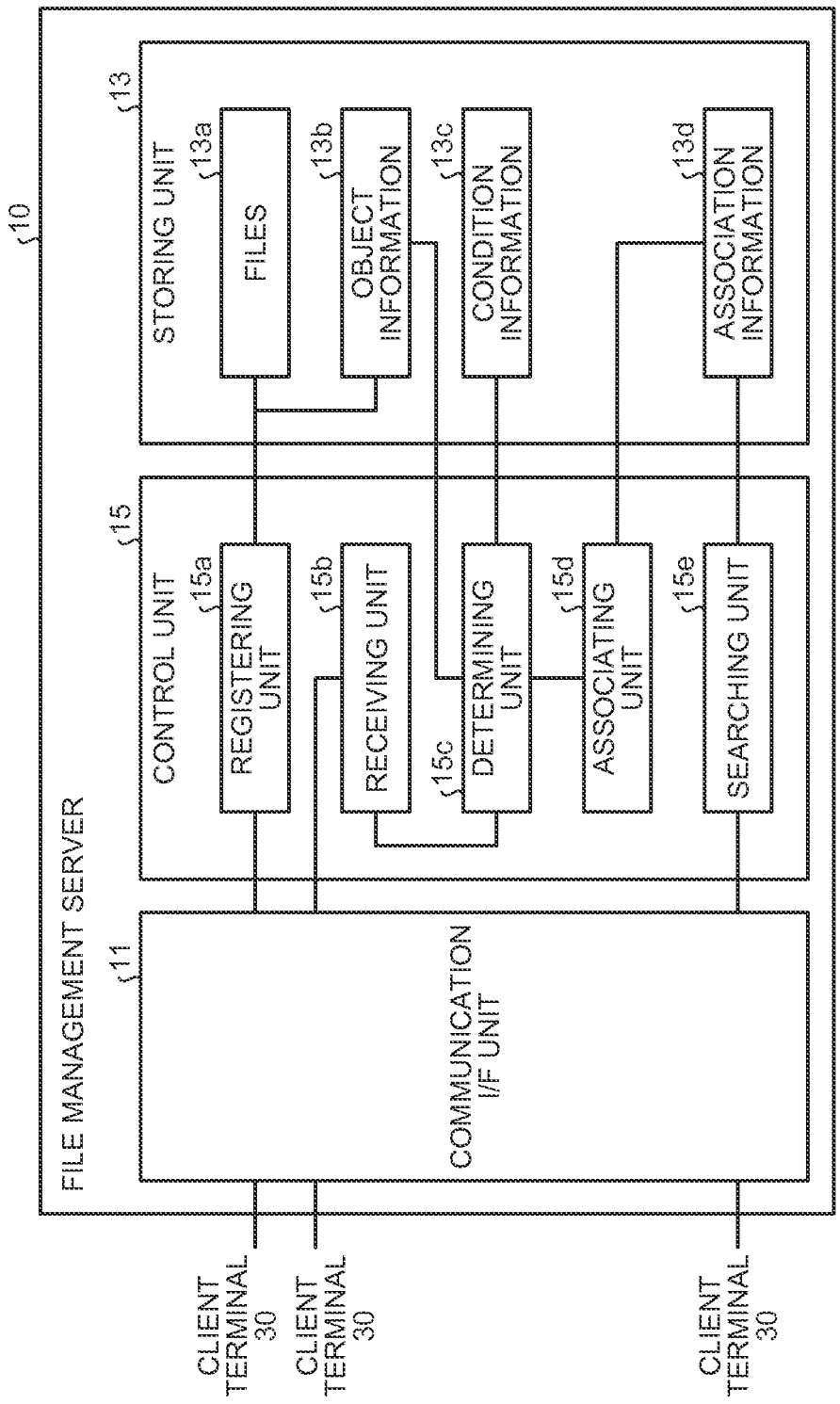
FIG. 2 is a block diagram illustrating the functional configuration of a file management server according to the first embodiment.

In the following, the functional configuration of the file management server 10 according to the first embodiment will be described. FIG. 2 is a block diagram illustrating the functional configuration of the file management server 10 according to the first embodiment. As illustrated in FIG. 2, the file management server 10 includes a communication interface (I/F) unit 11, a storing unit 13, and a control unit 15. The file management server 10 may also include, in addition to the functioning units illustrated in FIG. 2, various functioning units included in a known server device, such as various input devices or sound output devices.

The communication I/F unit 11 is an interface that performs communication control with, for example, the client terminal 30. An example of the communication I/F unit 11 includes a network interface card, such as a local area network (LAN) card. For example, the communication I/F unit 11 receives, from the client terminal 30, a command for a file operation, a file associated with a command, or a search request for the affected region in which a change in a file effects on another file or file element. Furthermore, the communication I/F unit 11 sends a file that is associated with the command for the file operation received from the client terminal 30 or sends the search result of the affected region due to the change.

The storing unit 13 is a storage device that stores therein various programs, such as an operating system (OS), an information management program, or the like, that are executed by the control unit 15. Examples of the storing unit 13 include a semiconductor memory device, such as a flash memory, or a storage device, such as a hard disk, an optical disk, and the like. The storing unit 13 is not limited to the storage device described above. A random access memory (RAM) or a read only memory (ROM) may also be used for the storing unit 13.

The storing unit 13 stores therein files 13a, object information 13b, condition information 13c, and association information 13d, which are examples of data used by the programs executed by the control unit 15. In addition to the files 13a, the object information 13b, the condition information 13c, and the association information 13d described above, the storing unit 13 also stores therein another piece of electronic data, such as an access right to a file for a person involved in development.

From among the files described above, the files 13a are various types of files created at each step of developing and designing a product. Examples of the files 13a include various types of document created at the step of performing, for example, a requirements analysis, an external design, or an internal design as well as various types of document created at the step of verifying a program that was programmed after designing the program, i.e., at the testing step. Specifically, the examples of the files 13a include various types of document, such as a "functional requirement document" in which specifications related to the function of a product are defined as the achievement of a requirements analysis, a "functional design document" in which the basic design related to the function of a product is defined as the achievement of an external design, and a "detailed functional design document" in which a detailed design related to the function of a product is defined as the achievement of an internal design. Furthermore, the examples of the files 13a include a document such as a "requirement test specification document" in which a plan for testing a program is defined in terms of requirements, a "functional test specification document" in which a plan for testing a program is defined in terms of the function, or the like.

Figure 3:
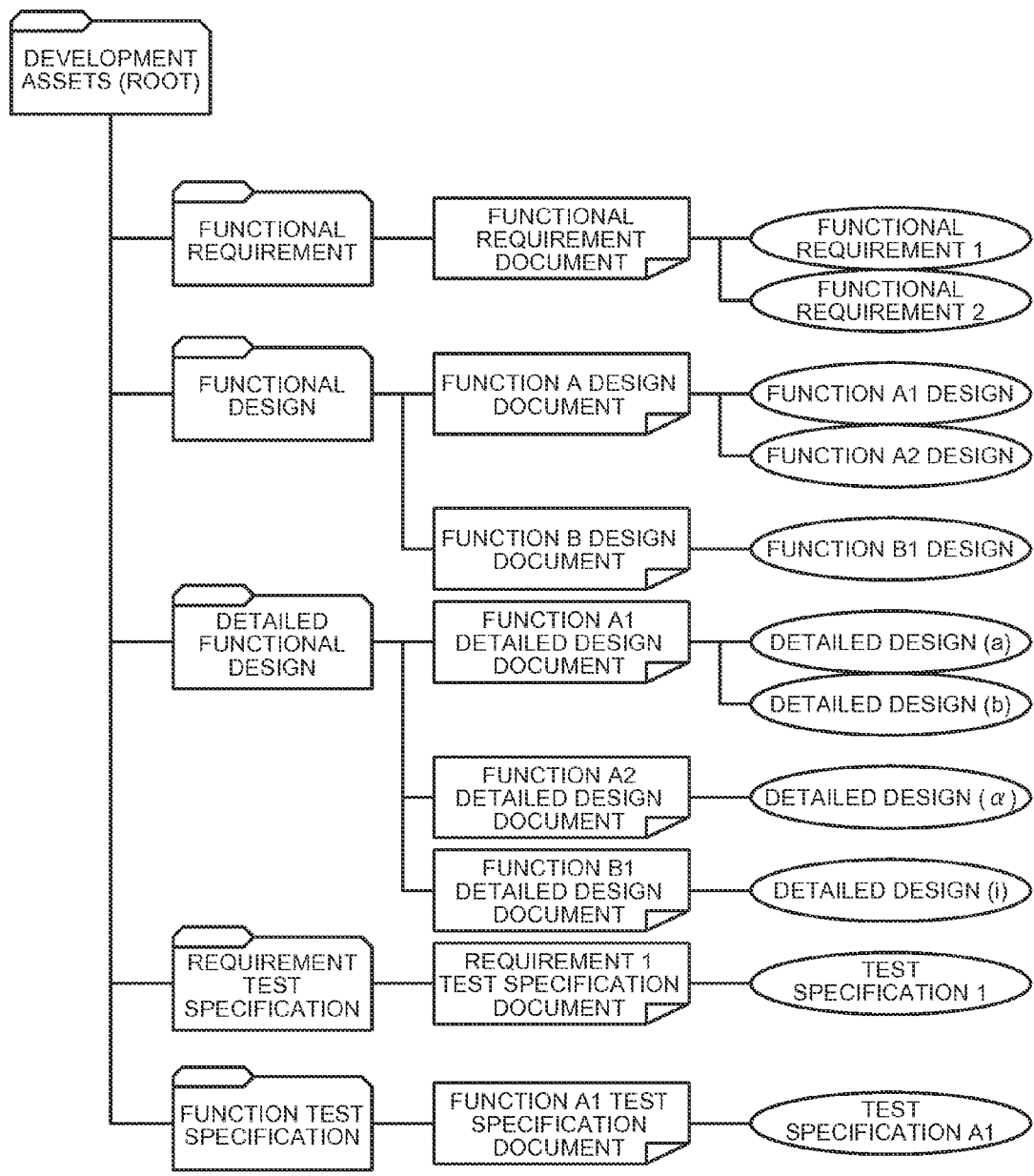
FIG. 3 is a schematic diagram illustrating an example of the tree structure.

A virtual tree structure is used for displaying or for operations of the files 13a with respect to the client terminal 30. FIG. 3 is a schematic diagram illustrating an example of the tree structure. FIG. 3 illustrates an example of the tree structure in which the root folder is placed on the top of the tree and each of the steps of developing and designing products, such as "functional requirement", "functional design", "detailed functional design", "requirement test specification", and "functional test specification", are placed as folders under the root folder.

As illustrated in FIG. 3, the folder named the "functional requirement" stores therein the file named the "functional requirement document". The file named the "functional requirement document" includes therein file elements, i.e., "functional requirement 1" and "functional requirement 2". The folder named the "functional design" stores therein two files, i.e., the "function A design document" and the "function B design document". Among these files, the file named the "function A design document" includes therein file elements, i.e., the "function A1 design" and the "function A2 design", whereas the file named the "function B design document" includes therein a file element named the "function B1 design". The folder named the "detailed functional design" stores therein three files, i.e., the "function A1 detailed design document", the "function A2 detailed design document", and the "function B1 detailed design document". Among these files, the file named the "function A1 detailed design document" includes file elements, i.e., the "detailed design (a)" and the "detailed design (b)". The file named the "function A2 detailed design document" includes therein a file element, i.e., the "detailed design (α)". The file named the "function B1 detailed design document" includes therein a file element, i.e., the "detailed design (i)". Furthermore, the folder named the "requirement test specification" stores therein the file named the "requirement 1 test specification document". The file named the "requirement 1 test specification document" includes therein the "test specification 1" that is related to the functional requirement 1. Furthermore, the folder named the "function test specification" stores therein the file named the "function A1 test specification document" that includes therein the "test specification A1" that is related to the function A1.

The object information 13b is information related to an object, such as a folder, a file, or a file element, on which the above associating process is performed. When a file operation is performed by the client terminal 30, the object information 13b is created, updated, or deleted by a registering unit 15a, which will be described later.

For example, when a file operation is received from the client terminal 30 indicating that a new folder is created in the file management server 10, the folder that has been newly created is newly registered as an object. Furthermore, when a file operation is received from the client terminal 30 indicating that a file is newly uploaded, the file that is newly uploaded is newly registered as an object. At this point, after a specific file element is extracted from the content in the newly uploaded file, the file element is newly registered as an object. Furthermore, when a file operation is received from the client terminal 30 indicating that a folder in the file management server 10 is deleted, objects, such as the folder that received the file operation, the file included in the folder, and the file element included in the file, are deleted. When a file operation is received indicating that a file is to be deleted, objects, such as the file that received the file operation and the file element that is included in the file, are deleted. Furthermore, when a file operation is received from the client terminal 30 indicating that a file in the file management server 10 is to be updated, after a specific file element is again extracted from the content of the file to be updated, the file element is written as an object.

An example of the object information 13b includes therein data in which items of the "object identifier (ID)", the "type", the "folder", the "file", and a "file element" are associated. The "object ID" mentioned here indicates identification information that identifies an object. For example, a unique ID is attached to each object, i.e., a folder, a file, or a file element such that files in the same folder or file elements in the same file can be identified. The "type" mentioned here indicates the type of object. Examples of the "type" include a folder, a file, a file element, or the like.

FIG. 4 is a schematic diagram illustrating an example of the object information 13b. FIG. 4 illustrates each object, such as the folders, the files, and the file elements illustrated in FIG. 3. The object with the object ID "object0001" illustrated in FIG. 4 indicates the folder of the "functional requirement" illustrated in FIG. 3. In this way, when an object is a folder, as illustrated in FIG. 4, the fields of the file and the file element are blank. Furthermore, the object with the object ID "object0002" illustrated in FIG. 4 indicates the file named the "functional requirement document" illustrated in FIG. 3. In this way, when an object is a file, as illustrated in FIG. 4, the field of the file element is blank. Furthermore, the object with the object ID "object0003" illustrated in FIG. 4 indicates the file element named the "functional requirement 1" illustrated in FIG. 3. In this way, when an object is a file element, as illustrated in FIG. 4, a value is stored in each of the fields of the folder, the file, and the file element. The schema of the object information 13b illustrated in FIG. 4 is only an example and is not limited thereto. For example, instead of a folder or a file, a path that represents the storage location of the folder or the file may also be stored.

The condition information 13c is information in which the condition related to the association between objects is defined. An example of the condition information 13c includes a list, i.e., a white list, in which the condition that permits two objects to be associated with each other. In the following, an example case in which the condition information 13c is a white list will be described; however, the condition information 13c may also be used as a black list.

At this point, the reason that the condition is set for associating objects is to reduce the possibility of files that have weak relationships from being erroneously associated with each other. In order to implement this, in the first embodiment, association is permitted for only a combination of objects that have dependency in which, between the two objects, one object depends on another object. An example of the dependency includes the following.

For example, when the object is seen as the folder illustrated in FIG. 3, i.e., is seen in terms of the granularity of steps, because the functional design is designed in accordance with the functional requirement document that has been subjected to the requirements analysis, i.e., in accordance with the functional specification, it can be assumed that the functional design depends on the functional requirement. Similarly, it can be assumed that the detailed design, i.e., the internal design, depends on the functional design; it can be assumed that the requirement test specification depends on a requirements analysis; and it can be assumed that the function test specification depends on the functional design.

Furthermore, when the object is seen in terms of the granularity of the file illustrated in FIG. 3, the detailed designs of the function A1 and the function B1 are performed in accordance with the function A design document in which the external design of the function A has been performed. Consequently, it is assumed that the function A1 detailed design document and the function A2 detailed design document depend on the function A design document. Similarly, it can be assumed that the function B1 detailed design document depends on the function B design document; it can be assumed that the requirement 1 test specification document depends on the functional requirement document; and it can be assumed that the function A1 test specification document depends on the functional design document.

Furthermore, when the object is seen in terms of the granularity of the file element illustrated in FIG. 3, because the external design of the function A is performed in accordance with the functional requirement 1 that is defined by the functional requirement document, it is assumed that the function A design document depends on the functional requirement 1 that is a file element. Furthermore, because the detailed design of the function A1 is performed in accordance with the function A1 design that is defined by the function A design document, it is assumed that the function A1 detailed design document depends on the function A1 design. Similarly, it can be assumed that the function A2 detailed design document depends on the function A2 design; it can be assumed that the function B1 detailed design document depends on the function B1 design; it can be assumed that the requirement 1 test specification document depends on the functional requirement 1; it can be assumed that the function A1 test specification document depends on the function A1 design; assumed that the test specification 1depends on the functional requirement 1; and it can be assumed that the test specification A1 depends on the function A1 design.

As described above, from among the combinations of the objects, the condition related to the combination of objects that have dependency in which one object depends on another object is set in the condition information 13c.

An example of the condition information 13c includes therein data in which items of the "condition number", the "type", the "condition 1", and the "condition 2" are associated. The "condition number" mentioned here indicates the identification information that identifies the condition. The "type" mentioned here indicates the type of condition. An example of the "type" includes the folder condition "folder" in which the granularity of the condition imposed on a dependent destination object, which is specified as an object on which the other object out of the two objects that are to be subjected to the association operation depends, is a folder. Another example of the "type" includes the file condition "file", in which the granularity of the condition imposed on a dependent destination object is a file. Another example of the "type" includes the file element condition "element", in which the granularity of the condition imposed on a dependent destination object is a file element. Furthermore, the "condition 1" indicates the condition imposed on a dependent destination object out of the two objects that are to be subjected to the association operation. The "condition 2" indicates the condition imposed on a dependent source object out of the two objects that are to be subjected to the association operation.

Figure 6:
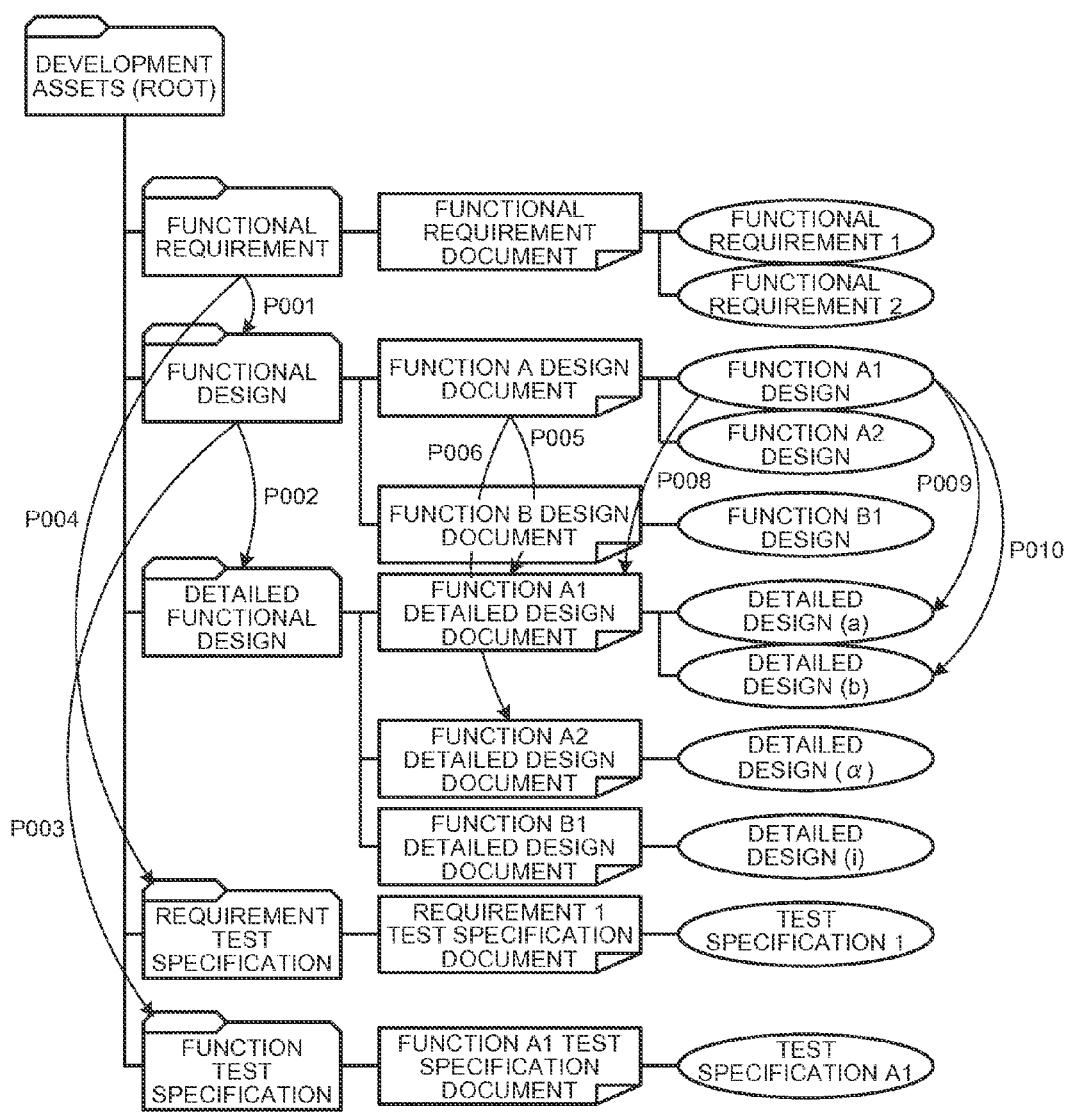
FIG. 6 is a schematic diagram illustrating an example of a folder condition, a file condition, and a file element condition.

FIG. 5 is a table illustrating an example of the condition information 13c. FIG. 6 is a schematic diagram illustrating an example of a folder condition, a file condition, and a file element condition. FIG. 5 illustrates the folder condition, the file condition, and the file element condition imposed when the objects illustrated in FIG. 3 are associated with each other. Furthermore, FIG. 6 illustrates, with arrows, the directions from the dependent destination objects to the dependent source objects targeted for the conditions illustrated in FIG. 5, i.e., the folder conditions, the file conditions, and the file element conditions. Furthermore, FIG. 6 selectively illustrates, from among the condition numbers illustrated in FIG. 5, the condition numbers "P001" and "P004", which are the folder conditions related to the folder name "functional requirement"; the condition numbers "P002" and "P003", which are the folder conditions related to the folder name "functional design"; the condition numbers "P005" and "P006", which are the file conditions related to the file name "function A design document"; and the condition numbers "P008" to "P010", which are the file element conditions related to the file element name "function A1 design". The direction of the arrow illustrated in FIG. 6 from the dependent destination object to the dependent source object matches the searching direction of the affected region due to a change, i.e., matches the direction of the effect exerted by a first object in which a change has occurred on a second object that is changed after the first object.

The conditions with the condition numbers "P001" to "P004" illustrated in FIG. 5 are examples of the folder conditions. For example, as illustrated in FIG. 6, in the folder condition with the condition number "P001" illustrated in FIG. 5, a requirement is set indicating that a folder belonging to a dependent destination object is the "functional requirement" and a folder belonging to a dependent source object is the "functional design". Furthermore, as illustrated in FIG. 6, in the folder condition with the condition number "P002" illustrated in FIG. 5, a requirement is set indicating that a folder belonging to a dependent destination object is the "functional design" and a folder belonging to a dependent source object is the "detailed functional design". Furthermore, as illustrated in FIG. 6, in the folder condition with the condition number "P003" illustrated in FIG. 5, a requirement is set indicating that a folder belonging to a dependent destination object is the "functional design" and a folder belonging to the dependent source object is the "function test specification". Furthermore, as illustrated in FIG. 6, in the folder condition with the condition number "P004" illustrated in FIG. 5, a requirement is set indicating that a folder belonging to a dependent destination object is the "functional requirement" and a folder belonging to the dependent source object is the "requirement test specification".

The conditions with the condition numbers "P005" and "P006" illustrated in FIG. 5 are examples of the file conditions. For example, as illustrated in FIG. 6, in the file condition with the condition number "P005" illustrated in FIG. 5, a requirement is set indicating that, between the two objects that have been subjected to the association operation, a file, which is specified as a dependent destination object or which includes a file element, is the "function A design document" and a file, which is specified as a dependent source object or which includes a file element, is the "function A1 detailed design document". Furthermore, as illustrated in FIG. 6, in the file condition with the condition number "P006" illustrated in FIG. 5, a requirement is set indicating that a file, which is specified as a dependent destination object or which includes a file element, is the "function A design document" and a file, which is specified as a dependent source object or which includes a file element, is the "function A2 detailed design document". A description has been given here of examples of the file conditions with the condition numbers "P005" and "P006"; however, in addition to these examples, other file conditions including the condition with the condition number "P007" may be set in the condition information 13c.

The condition with the condition numbers "P008" to "P010" illustrated in FIG. 5 are examples of the file element conditions. For example, as illustrated in FIG. 6, in the file element condition with the condition number "P008" illustrated in FIG. 5, a requirement is set indicating that, between the two objects that have been subjected to the association operation, a file element specified as a dependent destination object is the "function A1 design" and a file specified as a dependent source object is the "function A1 detailed design document". Furthermore, as illustrated in FIG. 6, in the file element condition with the condition number "P009" illustrated in FIG. 5, a requirement is set indicating that a file element specified as a dependent destination object is the "function A1 design" and a file element specified as a dependent source object is the "detailed design (a)". Furthermore, as illustrated in FIG. 6, in the file element condition with the condition number "P010" illustrated in FIG. 5, a requirement is set indicating that a file element specified as a dependent destination object is the "function A1 design" and a file element specified as a dependent source object is the "detailed design (b)". A description has been given here of examples of the file element conditions with the condition numbers "P008" to "P010"; however, in addition to these examples, other file element conditions including the conditions with the condition numbers "P011" to "P013" may be set in the condition information 13c.

In the example of the condition information 13c illustrated in FIG. 5, a description has been given of the case in which, when the dependent destination object completely matches the folder name, the file name, or the file element name that is set in "condition 1" and the dependent source object also completely matches the folder name, the file name, or the file element name that is set in "condition 2", it is determined that this matching satisfies the folder condition, the file condition, or the file element condition. However, it may also be determined that, when the "condition 1" and the "condition 2" partially match, this matching satisfies the condition. For example, it is assumed that function A is set in the condition 1 for the file element condition and function A1 is set in the condition 2. In such a case, when an object, as the dependent destination, that has a file element name that is partially matches the condition 1 "function A1" is specified and when an object, as the dependent source, that has a file element name or a file name that partially matches the condition 2 "function A1" is specified, it is determined that this matching satisfies the file element condition. Consequently, for example, when a file element name specifies the function A1 design as a dependent destination object and when an association operation in which the file name specifies the function A1 detailed design document as the dependent source object has been performed, it is determined that this matching satisfies the file element condition.

The association information 13d is information related to associating multiple pieces of file information, i.e., related to associating objects. When a combination of dependent destination object and dependent source object that have been subjected to the association operation satisfies at least one condition from among the folder condition, the file condition, and the file element condition, a combination of the dependent destination object and dependent source object is additionally registered in the association information 13d by an associating unit 15d.

An example of the association information 13d includes information in which items of an "object $ID_1$" and an "object $ID_2$" are associated with each other. The "object $ID_1$" mentioned here indicates, from among the combinations of the objects, the object ID of a dependent destination object and the "object $ID_2$," indicates, from among the combinations of the objects, the object ID of a dependent source object.

FIG. 7 is a schematic diagram illustrating an example of the association information 13d. FIG. 7 illustrates the combination of objects that have been subjected to an associating process from among the objects illustrated in FIG. 3. For example, in the combination of the object $ID_1$ "object0002" and the object $ID_2$ "object0006" illustrated in FIG. 7, the association, i.e., the relationship, is set between the file named the functional requirement document and the file named the function A design document. This relationship indicates that the file named the function A design document depends on the file named the functional requirement document. Furthermore, in the combination of the object $ID_1$ "object0003" and the object $ID_2$ "object0006" illustrated in FIG. 7, the relationship is set between the file element named the functional requirement 1 and the file named the function A design document. This relationship indicates that the file named the function A design document depends on the file element named the functional requirement 1. Furthermore, in the combination of the object $ID_1$ "object0003" and the object $ID_2$ "object0021" illustrated in FIG. 7, the relationship is set between the file element named the functional requirement 1 and the file element named the test specification 1. This relationship indicates that file element named the test specification 1 depends on the file element named the functional requirement 1.

The control unit 15 includes an internal memory that stores therein control data and programs that prescribe various kinds of procedures, whereby various kinds of processes are executed. As illustrated in FIG. 2, the control unit 15 includes the registering unit 15a, a receiving unit 15b, a determining unit 15c, the associating unit 15d, and a searching unit 15e.

From among these units, the registering unit 15a is a processing unit that registers a file received from the client terminal 30 in the storing unit 13. For example, when the registering unit 15a receives a file operation from the client terminal 30 indicating that a file is newly uploaded, the registering unit 15a registers the newly uploaded file in the storing unit 13. Furthermore, the registering unit 15a allocates an object ID to the newly uploaded file; associates, together with the object ID and the type of the file, the name of the file, and the name of the folder in which the file is stored; and then additionally registers them in the object information 13b in the storing unit 13. Furthermore, the registering unit 15a extracts a specific file element representing, for example, the feature of the file, in the content of the newly uploaded file. For example, an example of the specific file element to be extracted includes information, such as a number, a symbol, a character string, or the like, that is stored in a cell located at the same row or the same column as that of a predetermined item. The item extracted from a cell in this way may be set in accordance with the content of a document. For example, when a file element is extracted from the file named the functional requirement document, it is possible to set, in advance, an item related to the identifier, the name, or the description that represents the feature of each functional requirement that has been subjected to the requirements analysis. Then, the registering unit 15a allocates an object ID to each of the file elements that has been extracted before. Then, the registering unit 15a associates, together with the object ID and the type of the file element, the name of the file element, the name of the extraction source file from which the file element is extracted, and the name of the folder in which the extraction source file is stored and then additionally registers them in the object information 13b in the storing unit 13.

Furthermore, for example, when the registering unit 15a receives a file operation from the client terminal 30 indicating that the files in the file management server 10 are updated, the registering unit 15a overwrites the files that are targeted for the update and then registers the files in the storing unit 13. Furthermore, the registering unit 15a re-extracts specific file elements in the contents of the files targeted for the update. Then, the registering unit 15a allocates the object ID to a file element, from among the re-extracted file elements, that does not match the file elements that were extracted before the update. Then, the registering unit 15a associates, together with the object ID and the type of the file element on which the allocation has been performed, the name of the file element, the name of the re-extracted source file of the file element, and the name of the folder in which the extraction source file is stored and then additionally registers them in the object information 13b in the storing unit 13. At this point, the registering unit 15a deletes, from the object information 13b in the storing unit 13, the record of the file element, from among the file elements that was extracted before the update, that has not been re-extracted.

The receiving unit 15b is a processing unit that receives an association operation that associates multiple objects, from among the files managed by the file management server 10, that are related to each other. For example, when the receiving unit 15b receives a command for starting an association operation from the client terminal 30, the receiving unit 15b displays a screen in which a dependent destination object and a dependent source object are specified by a client application running on the client terminal 30. By doing so, the receiving unit 15b receives the specified dependent destination object and the dependent source object via a graphical user interface (GUI) in the client terminal 30. At this point, when the dependent destination object and the dependent source object are specified, a combination of, for example, files, a file element and a file, or file elements are specified. In this example, a description has been given of a case in which a dependent destination object and a dependent source object are specified by an operation performed by a person involved in development; however, a dependent destination object and a dependent source object may also be automatically extracted.

The determining unit 15c is a processing unit that refers to the condition information 13c stored in the storing unit 13 and determines whether an association operation is permitted.

For example, when the determining unit 15c receives an association operation that specifies a dependent destination object and a dependent source object, the determining unit 15c refers to the object information 13b and specifies a folder to which the dependent destination object belongs and a folder to which the dependent source object belongs, which are specified by the receiving unit 15b. For example, when the specified object is a file, a folder name in a record that includes the specified file name is extracted from among the records in the object information 13b. Furthermore, when the specified object is a file element, a folder name in a record that includes the specified file element name is extracted from among the records in the object information 13b.

Then, the determining unit 15c determines whether a folder to which the dependent destination object belongs and a folder to which the dependent source object belongs satisfy one of the folder conditions that are set in the condition information 13c. For example, when the folder name of the folder, in which the file specified as the dependent destination object is stored, or the folder name of the folder, in which the file that includes the file element that is specified as the dependent destination object is stored, completely matches the folder name that is set in the condition 1 that includes the folder conditions illustrated in FIG. 5 and when the folder name of the folder, in which the file specified as the dependent source object is stored, or the folder name of the folder, in which the file that includes the file element that is specified as the dependent source object, also completely matches the folder name that is set in the condition 2 that includes the folder conditions illustrated in FIG. 5, the determining unit 15c determines that the combination of the objects that have been subjected to the association operation satisfies the folder condition. Depending on whether the folder condition is satisfied, it is determined whether the dependent destination object and the dependent source object have the dependency in terms of the granularity of the "folder". At this point, when neither of the folder conditions that are set in the condition information 13c are satisfied, it is conceivable that there is a high possibility that the combination of the dependent destination object and the dependent source object is incorrect that has no dependency. In such a case, the determining unit 15c prohibits the associated combination of the objects that have been subjected to the association operation.

In contrast, when any one of the folder conditions that are set in the condition information 13c is satisfied, the determining unit 15c determines whether the folder condition is satisfied as follows. Namely, the determining unit 15c determines whether the file corresponding to the dependent destination object and the file corresponding to the dependent source object satisfy one of the file conditions that are set in the condition information 13c. For example, when the file name of the file, which is specified as the dependent destination object, or the file name of the file, which includes the file element that is specified as the dependent destination object, completely matches the file name that is set in the condition 1 that includes the file conditions illustrated in FIG. 5 and when the file name of the file, which is specified as the dependent source object, or the file name of the file, which includes the file element specified as the dependent source object, also completely matches the file name that is set in the condition 2 that includes the file conditions illustrated in FIG. 5, the determining unit 15c determines that the combination of the objects that have been subjected to the association operation satisfies the file condition. Depending on whether the folder condition is satisfied, it is determined whether the dependent destination object and the dependent source object have the dependency in terms of the granularity of the "file".

At this point, when neither of the file conditions that are set in the condition information 13c are satisfied, it is conceivable that there is a high possibility that the combination of the dependent destination object and the dependent source object is incorrect that has no dependency. In such a case, the determining unit 15c prohibits the associated combination of the objects that have been subjected to the association operation.

In contrast, when any one of the file conditions that are set in the condition information 13c is satisfied, the determining unit 15c determines whether the granularity of the object specified as the dependent destination is a file element. At this point, when the granularity of the dependent destination object is not a file element but is a file, it can be determined that the combination of the objects subjected to the association operation is a combination of files. In such a case, there is no need to determine whether the file element condition that has a smaller granularity than that of the file condition is satisfied. Consequently, the determining unit 15c permits to associate the combination of the objects that have been subjected to the association operation.

Furthermore, when the granularity of the object specified as the dependent destination is a file element, it is determined that the combination of the objects subjected to the association operation is either a combination between a file element and a file or a combination between file elements. In such a case, the determination of the file element condition continues. Specifically, the determining unit 15c determines whether the file element, which corresponds to the dependent destination object, and the file or the file element, which corresponds to the dependent source object, satisfy one of the file element conditions that are set in the condition information 13c. For example, when the file element name of the file element, which is specified as the dependent destination object, and the file element name, which is set in the condition 1 that includes the file element conditions illustrated in FIG. 5, completely match and when the file name of the file, which is specified as the dependent source object, or the file element name of the file element, which is specified as the dependent source object, also completely matches the file name or the file element name that is set in the condition 2 that includes the file element conditions illustrated in FIG. 5, the determining unit 15c determines that the combination of the objects subjected to the association operation satisfies the file element condition. Depending on whether the folder condition is satisfied, it is determined whether the dependent destination object and the dependent source object have the dependency in terms of the granularity of the "file element".

At this point, when neither of the file element conditions that are set in the condition information 13c are satisfied, it is conceivable that there is a high possibility that the combination of the dependent destination object and the dependent source object is incorrect that has no dependency. In such a case, the determining unit 15c prohibits the associated combination of the objects that have been subjected to the association operation. In contrast, when any one of the file element conditions that are set in the condition information 13c is satisfied, it can be determined that the dependency has been checked with respect to all the granularity of the folders, the files, and the file elements. In such a case, the determining unit 15c permits to associate the combination of the objects that have been subjected to the association operation.

A description has been given of a case in which it is determined, by using the folder conditions, the file conditions, and the file element conditions, whether the association is permitted or prohibited; however, it is also determined, by using at least one of the conditions from among the folder conditions, the file conditions, and the file element conditions, whether the condition is satisfied. For example, when the folder condition is satisfied, the determining unit 15c may also permit to associate the combination of objects that have been subjected to the association operation. Furthermore, when the file condition is satisfied, the determining unit 15c may also permit to associate the combination of objects that have been subjected to the association operation. Furthermore, when the file element condition is satisfied, the determining unit 15c may also permit to associate the combination of objects that have been subjected to the association operation.

The associating unit 15d is a processing unit that associates objects with each other. For example, when the determining unit 15c permits the association, the associating unit 15d additionally registers, in the association information 13d, the association of the dependent destination object and the dependent source object. At this point, the associating unit 15d stores a dependent destination object in the field of the object $ID_1$ from among the fields in the association information 13d and stores a dependent source object in the field of the object $ID_2$.

Figure 8:
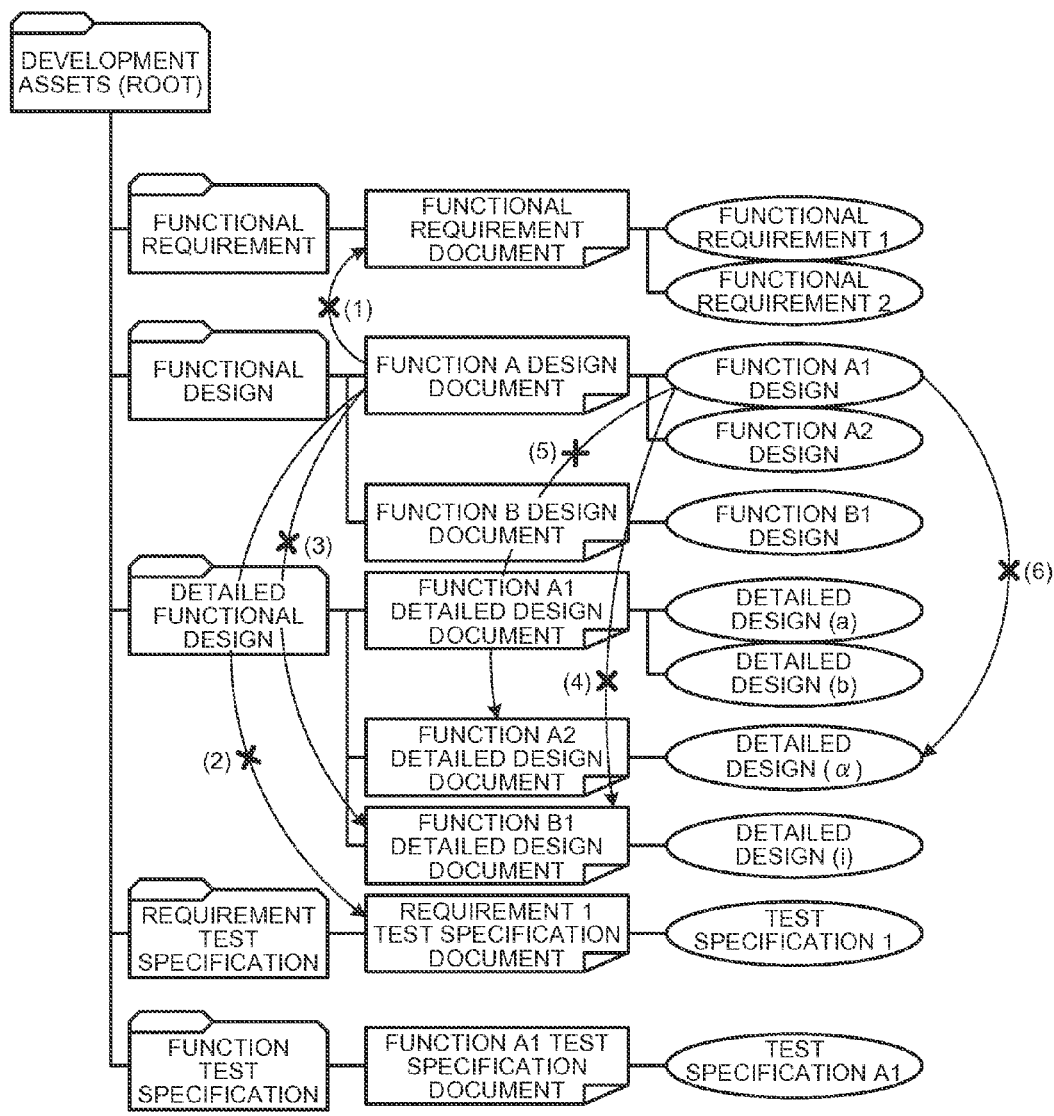
FIG. 8 is a schematic diagram illustrating an example of a state in which association is prohibited.

In the following, a specific example of a case in which association is prohibited will be described with reference to FIG. 8. FIG. 8 is a schematic diagram illustrating an example of a state in which association is prohibited. FIG. 8 illustrates examples of the association operations that do not satisfy the folder conditions, the association operations that do not satisfy the file conditions, and the association operations that do not satisfy the file element conditions, all of which are set in the condition information 13c illustrated in FIG. 5.

For example, a description will be given of a case in which the file named the "function A design document" is specified as the dependent destination object. At this point, in the folder condition, it is not permitted for an association operation to specify, as the dependent source, an object that is created at the step previous to the step in which another object is specified as the dependent destination. Consequently, as illustrated at (1) in FIG. 8, the association operation that associates, as the dependent source object, the functional requirement document created at the step of requirements analysis that is performed previous to the step of external design in which the function A design document is created does not satisfy the folder condition. Thus, the association is prohibited. Furthermore, in the folder condition, it is not permitted for the association operation to specify, as the dependent source, an object that is created at the step in which objects have weak relationship even if the step is performed after the step in which another object is specified as the dependent destination. Consequently, as illustrated at (2) in FIG. 8, the association operation that specifies the requirement test specification document as the dependent source object does not satisfy the folder condition, and thus the association is prohibited.

Furthermore, a description will be given of a case in which the file named the "function A design document" is specified as the dependent destination object. At this point, in the file condition, it is not permitted for the association operation to perform on objects, where the function of one file is not included in the function of another file. Consequently, as illustrated at (3) in FIG. 8, the association operation in which the function B1 design that is not included in the function A design document specifies, as the dependent source, the function B1 detailed design document that is subjected to the detailed design does not satisfy the file condition, and thus the association is prohibited.

In the following, a description will be given of a case in which the file element named the "function A1 design" is specified as the dependent destination object. At this point, in the file element condition, it is not permitted for the association operation to perform on objects that do not have the same function. Consequently, as illustrated at (4) in FIG. 8, the association operation that specifies, as the dependent source object, the function B1 detailed design document, in which the function B1, which belongs to the function B that is different type of the function A1 in the function A1 design that is specified as the dependent destination and which has been subjected to the detailed design, does not satisfy the file element condition and thus the association is prohibited. Furthermore, as illustrated at (5) and (6) in FIG. 8, even when the function A2 detailed design document, in which the function A2, which belongs to the same type of the function A in the function A1 in the function A1 design that is specified as the dependent destination and which has been subjected to the detailed design, is specified as the dependent source object, the functions are not the same, even though both the functions of the dependent destination object and the dependent source object are similar. Consequently, the association operation, in which the function A2 detailed design document and the detailed design (α) that is defined in the function A2 detailed design document are specified as the dependent source object, does not satisfy the file element conditions. Thus, the association is prohibited.

A description will be given here by referring back to FIG. 2. The searching unit 15e is a processing unit that refers to the association information 13d and searches for an affected region in which a change in a file element has an effect on another file. For example, the searching unit 15e receives a file element that is specified by the client terminal 30 as the target for a change. Then, the searching unit 15e searches the association information 13d for a dependent destination object. In the example illustrated in FIG. 7, the searching unit 15e searches the object $ID_1$ for a dependent source object, i.e., a record, that has the same file element as that specified. Then, the searching unit 15e repeatedly searches, for several times until the searching ends, the association information 13d for the dependent source object, i.e., a record, that has the same object as that searched for immediately previously and that is associated with the dependent destination objects in the association information 13d. When the searching ends after a predetermined number of times, the searching unit 15e outputs the searched objects to the client terminal 30 as the search result of the affected region. At this point, the searching unit 15e can output the searched objects in accordance with a predetermined granularity. For example, when a file is set as the granularity of the object to be output as the search result of the affected region, the searching unit 15e outputs the file, from among the searched objects, as the search result of the affected region without processing anything. In contrast, for the file element, the searching unit 15e may also output, instead of the file element, the file that includes the file element as the search result of the affected region.

Figure 10:
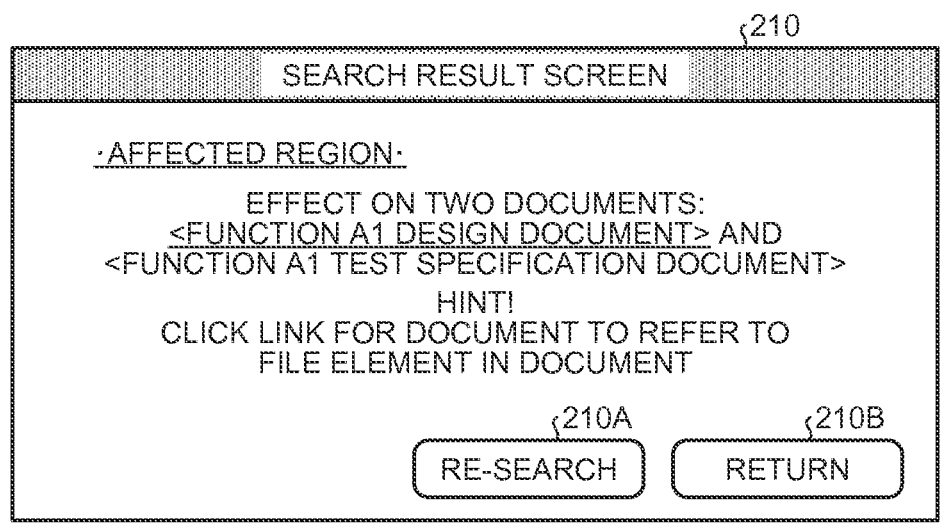
FIG. 10 is a schematic diagram illustrating an example of a screen displayed on a client terminal.

FIGS. 9 and 10 are schematic diagrams each illustrating an example of a screen displayed on the client terminal 30. FIG. 9 illustrates an example of a search screen 200 to which various search conditions can be input. FIG. 10 illustrates an example of a search result screen 210 that includes the search result of the affected region obtained when the search conditions illustrated in FIG. 9 are input. On the search screen 200 illustrated in FIG. 9, pull-down menus for a folder, a file, and a file element are arranged. Consequently, a person involved in development can specify a file element targeted for a change by operating the menus in the order of the folder, the file, and the file element. Furthermore, other pull-down menus, such as a "search count" and the "granularity that is output as the search result of the affected region", are also arranged in the search screen 200. Consequently, it is possible to receive, in addition to the file element targeted for the change, the search count, and the granularity.

As illustrated in FIG. 9, when a search button 200A is pressed in the state in which the file element "function A1 design", the search count "1", and the granularity "file" are being selected on the search screen 200, the following search is performed by referring to the association information 13d illustrated in FIG. 7. Namely, the specified file element "function A1 design" stored in the object $ID_1$ in the association information 13d, i.e., the object $ID_2$ of "object0012", "object0013", "object0014", and "object0024" that have the same file element as that of "object0007" is searched. In the example illustrated in FIG. 9, because the search count is one, the search ends this time, i.e., a first search. When a cancel button 200B is pressed, the screen shifts, after the search is stopped, for example, to the screen immediately previously displayed on the client terminal 30 or to the top screen of developing and designing a product.

From among the object IDs of "object0012", "object0013", "object0014", and "object0024" obtained at the searching, the object IDs of "object0013" and "object0014" are associated with the detailed design (a) and the detailed design (b). Furthermore, the object ID "object0024" is associated with the test specification A1. These object IDs "object0013", "object0014", and "object0024" are file elements. In the example illustrated in FIG. 9, because the "file" is specified as the granularity, the file named the "function A1 detailed design document" that includes the file element of the object IDs "object0013" and "object0014" is extracted instead of the detailed design (a) and the detailed design (b). Furthermore, the file named the "function A1 test specification document" that includes the file element of the object ID "object0024" is extracted instead of the test specification A1. In this example, because the object "function A1 detailed design document" associated with the object ID "object0012" is searched for, the search mentioned above does not always have to be performed.

Then, as illustrated in FIG. 10, two documents, i.e., the function A1 detailed design document that is associated with the object ID "object0012" and the function A1 test specification document that is associated with the object ID "object0024", are displayed on the search result screen 210. With this display, a person involved in development can be aware of the effect on function A1 detailed design document and the function A1 test specification document when the file element named function A1 design is changed. At this point, as in a conventional technology, when the association is performed on only file units, the function A2 detailed design document that is irrelevant to the function A1 design is output as the search result of the affected region. In contrast, in the first embodiment, because the search is performed by using the association information 13d in which association is performed on file element units, the function A2 detailed design document irrelevant to the function A1 design is not output. Consequently, the accuracy of traceability can be improved.

Thereafter, when a re-search button 210A on the search result screen 210 is pressed, the display of the screen on the client terminal 30 again shifts to the search screen 200 illustrated in FIG. 9. Then, after the "file element targeted for a change", the "search count", or the "granularity that is output as the search result of the affected region" are specified again, the re-search is performed. In contrast, when a return button 210B on the search result screen 210 is pressed, the screen shifts, for example, to the screen immediately previously displayed on the client terminal 30 or to the top screen of developing and designing products.

Various kinds of integrated circuits or electronic circuits may be used for the control unit 15. Furthermore, a part of the functioning unit included in the control unit 15 may also used as an integrated circuit or an electronic circuit. An example of the integrated circuit includes an application specific integrated circuit (ASIC). An example of the electronic circuit includes a central processing unit (CPU) or a micro processing unit (MPU).

Flow of a Process

In the following, a description will be given of the flow of a process performed by the file management server according to the first embodiment. An associating process performed by the file management server 10 will be described first and then a search process performed by the file management server 10 will be described.

(1) Associating Process

Figure 11:
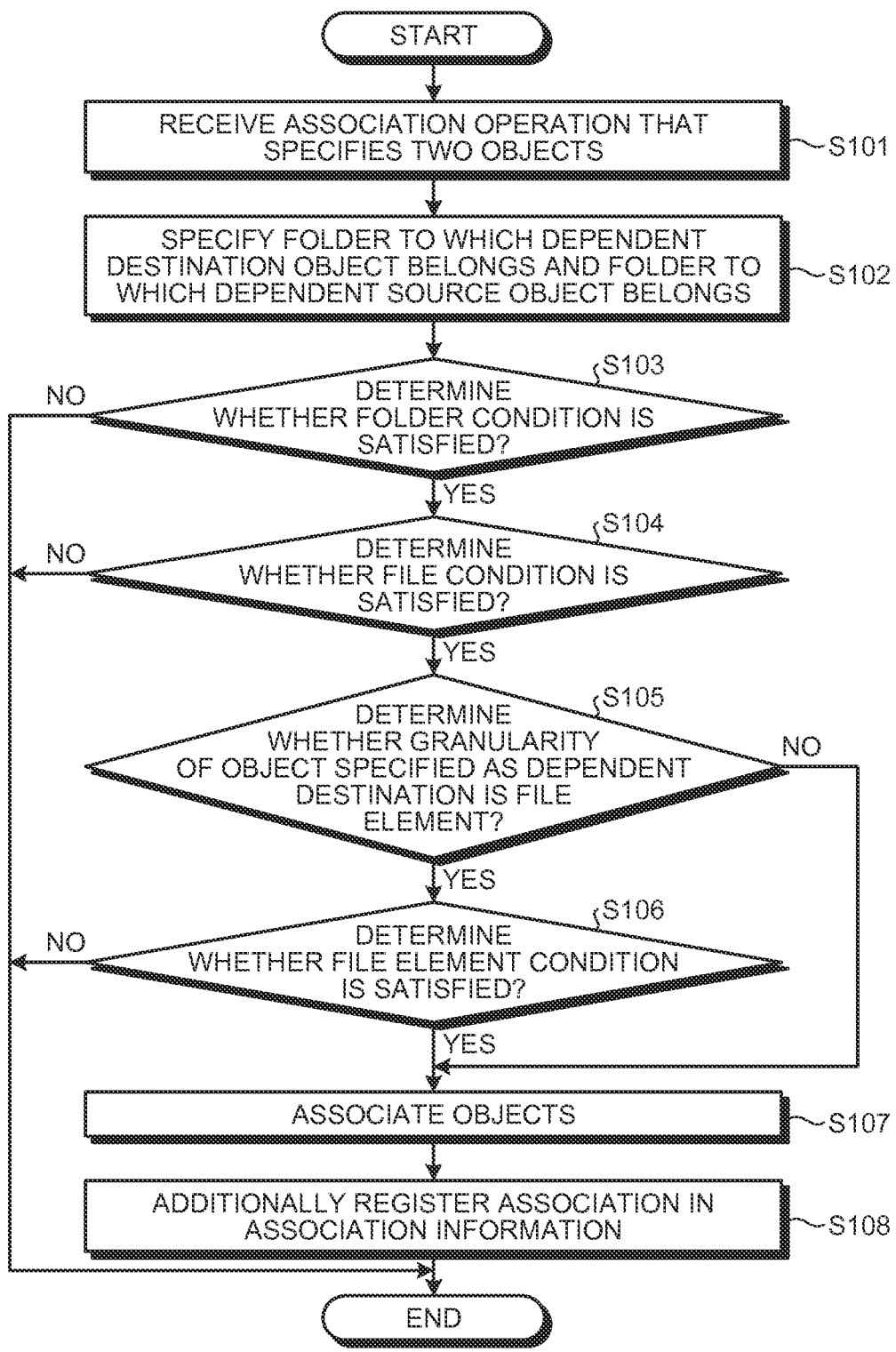
FIG. 11 is a flowchart illustrating the flow of an associating process according to the first embodiment.

FIG. 11 is a flowchart illustrating the flow of an associating process according to the first embodiment. The associating process is performed when the association operation that specifies a dependent destination object and a dependent source object is received.

As illustrated in FIG. 11, when the association operation that specifies a dependent destination object and a dependent source object is received (Step S101), the determining unit 15c performs the following process. Namely, the determining unit 15c refers to the object information 13b and then specifies the folder to which the dependent destination object received at Step S101 belongs and the folder to which the dependent source object received at Step S101 belongs (Step S102).

Then, the determining unit 15c determines whether the folder to which the dependent destination object belongs and the folder to which the dependent source object belongs satisfy one of the folder conditions that are set in the condition information 13c (Step S103).

When neither of the folder conditions that are set in the condition information 13c are satisfied (No at Step S103), it is conceivable that there is a high possibility that the combination of the dependent destination object and the dependent source object is incorrect that has no dependency. In such a case, the determining unit 15c does not perform the associating process on the combination of the objects subjected to the association and then ends the process without processing anything.

In contrast, when any one of the folder conditions that are set in the condition information 13c is satisfied (Yes at Step S103), the determining unit 15c determines whether the file condition is satisfied as follows. Namely, the determining unit 15c determines whether the file corresponding to the dependent destination object and the file corresponding to the dependent source object satisfy any one of the file conditions that are set in the condition information 13c (Step S104).

When neither of the file conditions that are set in the condition information 13c are satisfied (No at Step S104), it is conceivable that there is a high possibility that the combination of the dependent destination object and the dependent source object is incorrect that has no dependency.

In such a case, the determining unit 15c does not perform the associating process on the combination of the objects subjected to the association and then ends the process without processing anything.

In contrast, when any one of the folder conditions that are set in the condition information 13c is satisfied (Yes at Step S104), the determining unit 15c determines whether the granularity of the object specified as the dependent destination is a file element (Step S105).

When the granularity is not a file element (No at Step S105), it can be determined that the combination of the objects subjected to the association operation is files. In such a case, there is no need to determine whether the file element condition that has a smaller granularity than that of the file condition is satisfied. Consequently, the association of the combination of the objects subjected to the association operation is permitted and then the process proceeds to Step S107.

In contrast, when the granularity of the object specified as the dependent destination is a file element (Yes at Step S105), it is determined that the combination of the objects subjected to the association operation is either a combination between a file element and a file or a combination between file elements.

In such a case, the determination of the file element condition continues. Specifically, the determining unit 15c determines whether the file element, which corresponds to the dependent destination object, and the file or the file element, which corresponds to the dependent source object, satisfy one of the file element conditions that are set in the condition information 13c (Step S106).

When neither of the file element conditions that are set in the condition information 13c are satisfied (No at Step S106), it is conceivable that there is a high possibility that the combination of the dependent destination object and the dependent source object is incorrect that has no dependency. In such a case, the determining unit 15c does not perform the associating process on the combination of the objects subjected to the association and then ends the process without processing anything.

In contrast, any one of the file element conditions that are set in the condition information 13c is satisfied (Yes at Step S106), the association of the combination of the object subjected to the association operation is permitted. In such a case, the associating unit 15d associates the dependent destination object with the dependent source object (Step S107); additionally registers the association in the association information 13d (Step S108); and then ends the process.

(2) Search Process

Figure 12:
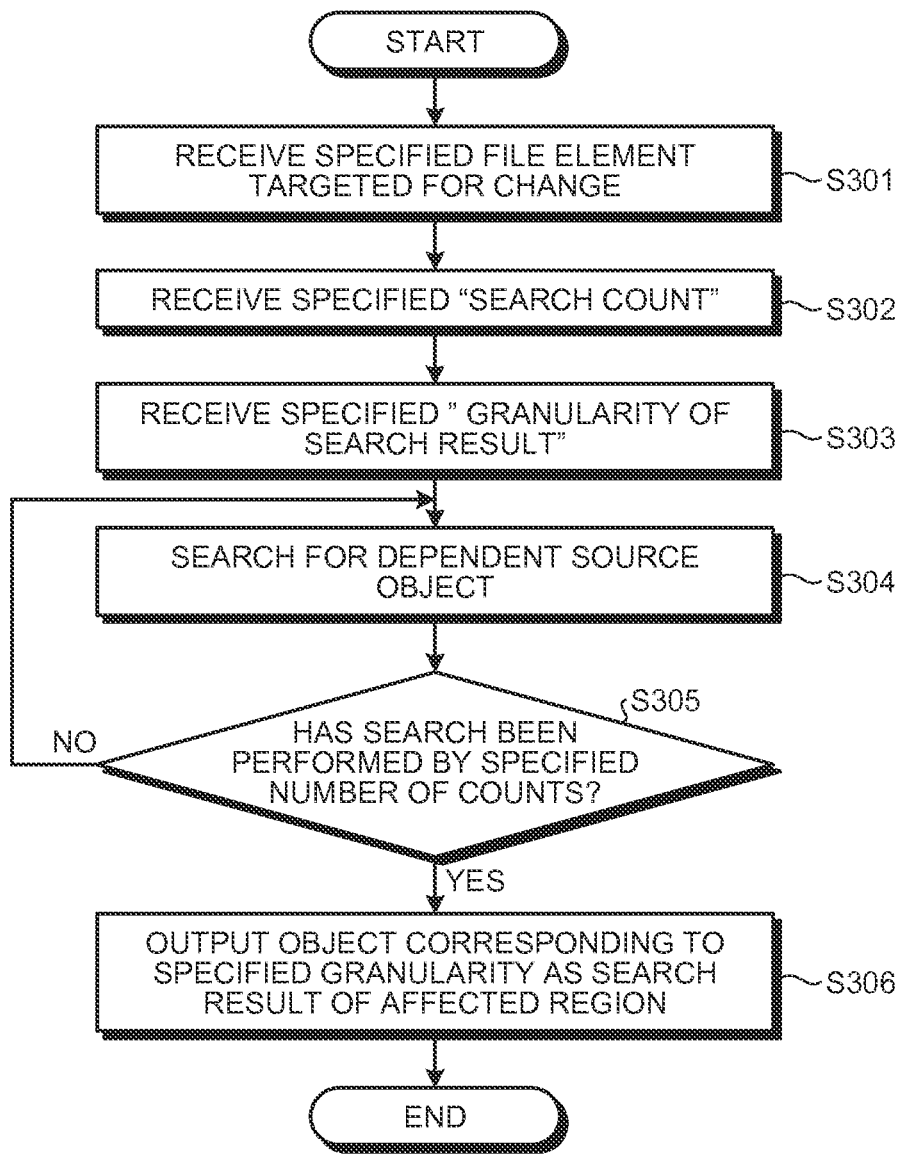
FIG. 12 is a flowchart illustrating the flow of a search process according to the first embodiment.

FIG. 12 is a flowchart illustrating the flow of a search process according to the first embodiment. This search process is performed when, for example, a search request is received from the client terminal 30. As illustrated in FIG. 12, the searching unit 15e receives, on the search screen displayed on the client terminal 30, the specified "file element targeted for a change", the "search count", or the "granularity that is output as the search result of the affected region" (Steps S301 to S303).

Then, the searching unit 15e searches the association information 13d for a dependent source object, i.e., a record, that has the same file element as that in the dependent destination object (Step S304).

The searching unit 15e repeatedly performs the search process that searches for a dependent source object, i.e., a record, that has the same object as that searched for immediately previously and that is associated with the dependent destination object in the association information 13d (Step S304) until the search has been performed by the number of counts specified at Step S302 (No Step S305).

After performing the search process for a predetermined number of times (Yes at Step S305), the searching unit 15e converts the object obtained in the search process to the granularity that is specified at Step S301; outputs the object as the search result of the affected region to the client terminal 30 (Step S306); and then ends the process.

The processes performed at Steps S301 to S303 illustrated in FIG. 12 may also be changed in any order or may also be performed in parallel. Furthermore, the processes performed at Steps S302 and S303 may also be skipped by setting, in advance, the search count and the granularity.

Advantage of the First Embodiment

As described above, when the file management server 10 according to the first embodiment receives an association operation that associates multiple objects, the file management server 10 refers to the condition in which the availability of association between objects is set. When the multiple objects satisfy the condition, the file management server 10 associates files. Consequently, the file management server 10 according to the first embodiment can inhibit erroneous file association.

[b] Second Embodiment

In the above explanation, a description has been given of the embodiments of the device according to the present invention; however, the present invention can be implemented with various kinds of embodiments other than the embodiments described above. Therefore, another embodiment included in the present invention will be described below.

Application Example

For example, the file management server 10 can determine whether the condition is satisfied in accordance with whether folders in which the dependency is defined have a loop relationship. For example, a description will be given with the assumption that the dependent destination objects and the dependent source objects in the condition information 13c form the following link of the relationship. Namely, it is assumed that the link of "file A→file B→file C→file D", i.e., a file B depends on a file A, a file C depends on the file B, and a file D depends on the file C, is formed. In such a case, when the association operation in which the dependent destination "file D" is associated with the dependent source "file A", if this association is permitted, the relationship becomes "file A→file B→file C→file D→file A", and thus the link of this relationship forms a loop. As described above, when the link of the relationship forms a loop, the same file may possibly redundantly searched for as the search result of the affected region. Accordingly, in order to inhibit a decrease in the accuracy of traceability, the file management server 10 can prohibit the association operation that forms a loop, e.g., "file D→file A".

Separation and Integration

The components of each unit illustrated in the drawings are not always physically configured as illustrated in the drawings. In other words, the specific shape of a separate or integrated device is not limited to the drawings. Specifically, all or part of the device can be configured by functionally or physically separating or integrating any of the units depending on various loads or use conditions. For example, the registering unit 15a, the receiving unit 15b, the determining unit 15c, the associating unit 15d, or the searching unit 15e may also be connected, via a network, as an external device of the file management server 10. Furthermore, the registering unit 15a, the receiving unit 15b, the determining unit 15c, the associating unit 15d, or the searching unit 15e are included in another device, are connected via the network, and cooperate with each other, whereby implementing the function performed by the file management server 10. Furthermore, the whole or a part of the files 13a, the object information 13b, the condition information 13c, or the association information 13d stored in the storing unit 13 may also be stored in another device, are connected via the network, and cooperate with each other, whereby implementing the function performed by the file management server 10.

Information Management Program

The various processes described in the above embodiments may also be implemented by a program prepared in advance and executed by a computer, such as a personal computer or a workstation. Accordingly, in the following, an example of a computer that executes an information management program having the same function as that performed in the embodiments described above will be described with reference to FIG. 13.

Figure 13:
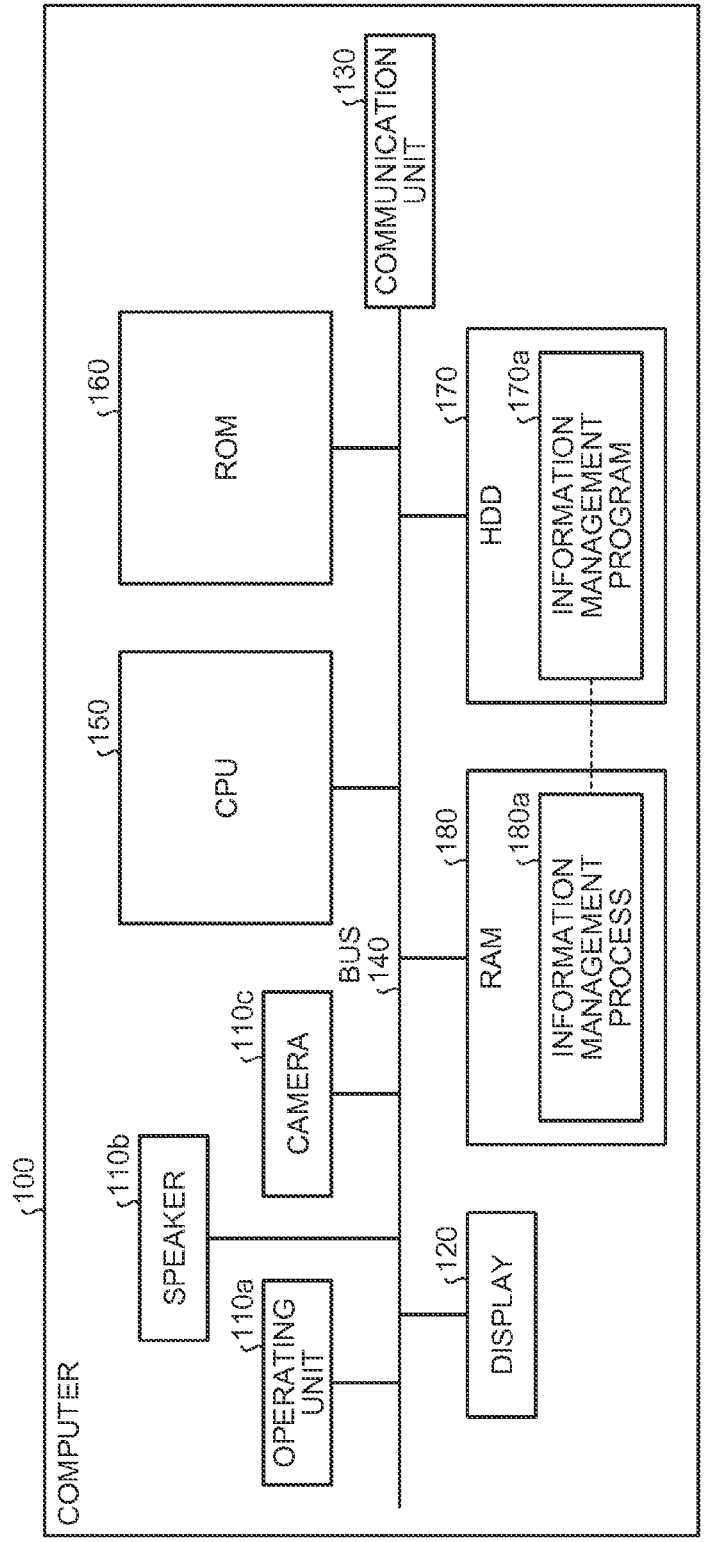
FIG. 13 is a block diagram illustrating an example of a computer that executes an information management program according to the first embodiment and a second embodiment.

FIG. 13 is a block diagram illustrating an example of a computer that executes an information management program according to the first embodiment and a second embodiment. As illustrated in FIG. 13, a computer 100 includes an operating unit 110a, a speaker 110b, a camera 110c, a display 120, and a communication unit 130. Furthermore, the computer 100 includes a CPU 150, a ROM 160, an HDD 170, and a RAM 180. All of the units 110 to 180 are connected via a bus 140.

As illustrated in FIG. 13, the HDD 170 stores therein, in advance, an information management program 170a having the same function as that performed by the registering unit 15a, the receiving unit 15b, the determining unit 15c, the associating unit 15d, and the searching unit 15e described in the first embodiment. Similarly to the configuration of each of the registering unit 15a, the receiving unit 15b, the determining unit 15c, the associating unit 15d, and the searching unit 15e illustrated in FIG. 2, the information management program 170a may also be integrated or separated. Specifically, not all pieces of the data need to be always stored in the HDD 170 as long as only the data needed for a process is stored in the HDD 170.

Then, the CPU 150 reads the information management program 170a from the HDD 170 and loads the program in the RAM 180. Consequently, as illustrated in FIG. 13, the information management program 170a functions as an information management process 180a. The information management process 180a loads, in an area of the RAM 180 allocated to various data that is read from the HDD 170 and executes various processes on the basis of the loaded various data. The information management process 180a includes processes, such as the processes illustrated in FIGS. 11 and 12, performed by the registering unit 15a, the receiving unit 15b, the determining unit 15c, the associating unit 15d, and the searching unit 15e illustrated in FIG. 2, for example. Furthermore, for each of the processing units virtually implemented in the CPU 150, not all of the processing units are needed to be always operated in the CPU 150 as long as only the processing unit need to be operated is virtually implemented.

Furthermore, the information management program 170a does not always need to be initially stored in the HDD 170 or the ROM 160. For example, each program may be stored in a "portable physical medium", such as a flexible disk (FD), a CD-ROM, a DVD disk, a magneto-optic disk, of a IC card, that is to be inserted into the computer 100. Then, the computer 100 may read and execute the program from the portable physical medium. Furthermore, the program may be stored in another computer, a server device, or the like that is connected to the computer 100 through a public circuit, the Internet, a LAN, a WAN, or the like and the computer 100 may obtain the program from the other computer or the server device and execute the program.

According to an aspect of an embodiment, an advantage is provided in that it is possible to inhibit erroneous association of files.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A computer-readable recording medium having stored therein a file object association program causing a computer to execute a process comprising:

acquiring, as a dependent source object, a file or a file element associated with a part of a document included in a file;

acquiring, as a dependent destination object, a file or a file element associated with a part of a document included in a file;

referring to a storage that stores a permitted combination of a dependent destination folder and a dependent source folder, and determining whether a first folder including the dependent source object matches the dependent source folder among the combination stored in the storage, and whether a second folder including the dependent destination object matches the dependent destination folder among the combination stored in the storage; and associating, when the first folder matches the dependent source folder and the second folder matches the dependent destination folder, the dependent source object and the dependent destination object with each other.

2. The recording medium according to claim 1, wherein the storage stores dependency between objects associated at the associating;

the referring includes referring to the dependency between the objects stored in the storage;

the determining includes determining whether a loop relationship is formed by associating the dependent source object and the dependent destination object with each other; and the associating includes associating the dependent source object and the dependent destination object with each other provided that the loop relationship is not formed.

3. A file object association method comprising:

acquiring, as a dependent source object, a file or a file element associated with a part of a document included in a file;

acquiring, as a dependent destination object, a file or a file element associated with a part of a document included in a file;

referring to a storage that stores a permitted combination of a dependent destination folder and a dependent source folder, and determining whether a first folder including the dependent source object matches the dependent source folder among the combination stored in the storage, and whether a second folder including the dependent destination object matches the dependent destination folder among the combination stored in the storage, using a processor; and associating, using the processor, the dependent source object and the dependent destination object with each other, when the first folder matches the dependent source folder and the second folder matches the dependent destination folder.

4. A file object association device comprising:

a memory that stores therein a permitted combination of a dependent destination folder and a dependent source folder; and a processor coupled to the memory, wherein the processor executes a process comprising:

acquiring, as a dependent source object, a file or a file element associated with a part of a document included in a file;

acquiring, as a dependent destination object, a file or a file element associated with a part of a document included in a file;

referring to the memory, and determining whether a first folder including the dependent source object matches the dependent source folder among the combination stored in the memory, and whether a second folder including the dependent destination object matches the dependent destination folder among the combination stored in the memory; and associating, when the first folder matches the dependent source folder and the second folder matches the dependent destination folder, the dependent source object and the dependent destination object with each other.

* * * * *